United States Patent
Avanzi et al.

(10) Patent No.: US 9,094,191 B2
(45) Date of Patent: Jul. 28, 2015

(54) MASTER KEY ENCRYPTION FUNCTIONS FOR TRANSMITTER-RECEIVER PAIRING AS A COUNTERMEASURE TO THWART KEY RECOVERY ATTACKS

(71) Applicant: QUALCOMM Incorporated, San Diego, CA (US)

(72) Inventors: Roberto Avanzi, Munich (DE); Boris Dolgunov, Haifa (IL); Gregory Gordon Rose, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 153 days.

(21) Appl. No.: 13/830,598

(22) Filed: Mar. 14, 2013

(65) Prior Publication Data

US 2014/0270166 A1 Sep. 18, 2014

(51) Int. Cl.
*H04L 9/18* (2006.01)
*H04L 9/08* (2006.01)

(52) U.S. Cl.
CPC ............ *H04L 9/0825* (2013.01); *H04L 9/0822* (2013.01); *H04L 2209/60* (2013.01); *H04L 2209/76* (2013.01)

(58) Field of Classification Search
None
See application file for complete search history.

(56) References Cited

U.S. PATENT DOCUMENTS

| 8,259,949 | B2 | 9/2012 | Devanand et al. |
|---|---|---|---|
| 8,369,522 | B2 | 2/2013 | Shirai et al. |
| 2002/0191784 | A1* | 12/2002 | Yup et al. .................. 380/37 |
| 2009/0296938 | A1 | 12/2009 | Devanand et al. |
| 2010/0058052 | A1 | 3/2010 | Bartels et al. |
| 2010/0074441 | A1* | 3/2010 | Pauker et al. .................. 380/45 |
| 2012/0039474 | A1 | 2/2012 | Ho |

OTHER PUBLICATIONS

Yen-Cheng Chen, "An efficient nonce-based authentication scheme with key agreement", Applied Mathematics and Computation 169 (2005) 982-994, http://www.sciencedirect.com/science/article/pii/S0096300304008288.*
Wen-Gong Shieh, "Efficient remote mutual authentication and key agreement", Computer & Security 25 (2006) 72-77, http://www.sciencedirect.com/science/article/pii/S0167404805001719.*
Yamauchi H., et al., "Software obfuscation from crackers' viewpoint," Proceedings of the lasted international conference advances in computer science and technology, Jan. 2006, pp. 1-9.
Ed S B., et al., "Applied Cryptography Second Edition : protocols, algorithms, and source code in C", Jan. 1, 1996, Applied Cryptography, Protocols, Algorithms, and Source Code in C, John Wiley & Sons, Inc, New York, pp. 30/31,180/181,265-301,351, XP002104180, ISBN: 978-0-47111709-4, p. 352-353.

(Continued)

*Primary Examiner* — Saleh Najjar
*Assistant Examiner* — William G O'Hara
(74) *Attorney, Agent, or Firm* — Loza & Loza, LLP

(57) ABSTRACT

A method operational on a receiver device for exchanging and/or generating security keys is provided. A first encrypted master key Km is received at the receiver device from a transmitter device, the first encrypted master key Km secured by a receiver public key Kpub-rx. The first encrypted master key Km may be decrypted with a receiver private key Kpri-rx to obtain the master key Km. The master key Km may be encrypted using a block cipher that applies a receiver secret key Kh to obtain a second encrypted master key.

39 Claims, 10 Drawing Sheets

(56) References Cited

OTHER PUBLICATIONS

"High-bandwidth Digital Content Protection System—Interface Independent Adaptation", Oct. 16, 2012, XP055127799, pp. 1-78, Retrieved from the Internet: URL:http://www.digital-cp.com/files/staticpagefiles/6FEA6756-1A4B-B294-D0494S84C37A637F/HDCP Interface Independent Adaptation Specification Rev2 2 FINAL.pdf [retrieved on Jul. 9, 2014].

Intel Corp: "High Bandwidth Digital Content Protection System", Internet Citation, Jun. 9, 2003, XP002446784, pp. 1-85, Retrieved from the Internet: URL:http://www.digitalcp.com/home/HDCPSpecificationRev1 1.pdf [retrieved on Aug. 14, 2007].

International Search Report and Written Opinion—PCT/US2014/024756—ISA/EPO—Jul. 25, 2014.

"Block Cipher Modes of Operation," Wikipedia, the free encyclopedia, retrieved from the Internet < Url: http://web.archive.org/web/20130307201404/http://en.wikipedia.org/wiki/Block_cipher_mode_of_operation >.

Dworkin M., "Nist Special Publication 800-38A, 2001 Edition, Recommendation for Block Cipher Modes of Operation, Methods and Techniques," Dec. 1, 2001, p. complete, XP055012953, Retrieved from the Internet < URL: http://csrc.nist.gov/publications/nistpubs/800-38a/sp800-38a.pdf >, [retrieved on Nov. 23, 2011].

* cited by examiner

MASTER KEY ENCRYPTION FUNCTIONS FOR TRANSMITTER-RECEIVER PAIRING AS A COUNTERMEASURE TO THWART KEY RECOVERY ATTACKS

BACKGROUND

1. Field

Various features relate to the protection of keys in a key pairing exchange, and more particularly to improving security algorithms that employ self-inverting operations.

2. Background

High-bandwidth Digital Content Protection (HDCP) is an encryption protocol for copy-protected video content and is incorporated into digital video connection interfaces to block unauthorized transmission and reproduction of such content. With the release of HDCP versions 2.0 and 2.1, HDCP became interface-independent, and can be applied to any two way digital transmission between sources and displays, wired or wireless, compressed or uncompressed. The HDCP protocol comprises three phases: authentication, content encryption, and renewability.

During the authentication phase, encrypted messages and public keys are exchanged between an HDCP transmitter and an HDCP receiver to determine the receiver's identity and eligibility to accept protected content. If authentication is deemed successful, the transmitter proceeds to a content encryption phase. The transmitter encrypts protected audio and/or video (A/V) content using a master key $K_m$ (i.e., pairing master key) typically generated as part of a key exchange protocol in the authentication phase.

However, some receivers may be computationally limited and may not include or have write access to non-volatile storage/memory, thereby preventing the receiver from generating and/or storing the master key $K_m$. Without knowledge of the master key $K_m$, the receiver is unable to decrypt the encrypted A/V content.

FIG. 1 illustrates an example of the authentication phase between a transmitter device 102 and a receiver device 104. A transmitter device 102 is provisioned with a public key Kpub-tx and corresponding private key Kpri-tx. Similarly, the receiver device 104 is provisioned with or generates a public key Kpub-rx and corresponding private key Kpri-rx 108 along with a receiver secret key $K_h$ 110. During the authentication stage (which includes a key exchange), the transmitter device 102 sends its public key Kpub-tx to the receiver device 104 and the receiver device 104 sends 112 its public key Kpub-rx to the transmitter device 102. Note that, where the receiver device 104 does not include non-volatile memory, the public key Kpub-rx, corresponding private key Kpri-rx, and receiver secret key $K_h$ may be generated by the receiver device 104 for a particular power cycle or session.

In this security system, the transmitter device 102 may be provisioned with master keys corresponding to each receiver device. However, in some instances there is no corresponding master key for a receiver device (e.g., the receiver device does not have non-volatile memory). Consequently, the receiver device 104 may receive a message from the transmitter device 102 indicating that it does not have the master key $K_m$ corresponding to the receiver device.

As a result, transmitter device 102 may provide a master key $K_m$ to the receiver device 104. The transmitter device 102 encrypts 116 the master key $K_m$ with the receiver's public key Kpub-rx and generates a nonce m 118. The encrypted master key and nonce $E_{xpub-rx}(K_m, \text{nonce } m)$ are sent 120 to the receiver device 104. The receiver device 104 then decrypts 122 the encrypted master key and nonce m using its private key Kpriv-rx. The nonce m may be used to generate an initialization vector (IV). The receiver device 104 then encrypts 124 the master key $K_m$ using its own secret key $K_h$, the received nonce m, and using an Advanced Encryption Standard (AES) block cipher. For example, the AES block cipher may be AES-128 (Advanced Encryption Standard 128 bit algorithm) in counter (CTR) mode:

$$\text{Encrypt } K_m = E_{Kh,m}(K_m) = AES_{CTR\,Mode}[K_h](m) \oplus K_m.$$

The receiver device 104 then sends this encrypted master key $E_{Kh,\,m}(K_m)$ to the transmitter device 102. This encrypted master key $E_{Kh,\,m}(K_m)$ may be stored by the transmitter device 102 and used for subsequent handshakes between the transmitter device 102 to the receiver device 104. At subsequent handshakes, the transmitter device 102 sends 127 the encrypted master key $E(K_h)(K_m)$ with the nonce m, so that the receiver device 104 can decrypt it and verify that it is the same encrypted master key the receiver previously sent, thereby authenticating the transmitter.

The HDCP 2 protocol (versions 2.0 and 2.1) has a vulnerability by which a Man-In-The-Middle (MITM) (intercepting device 128) can intercept 130 the transmission 127 involving the master key $K_m$ between the transmitter device 102 and the receiver device 104 and abuse the receiver device 104 to decrypt this master key $K_m$. However, the transmitted $E_{Kh,\,m}(K_m)$ 127, is just the XOR of the mast key $K_m$ with the receiver's secret $K_h$ and the nonce m. An attacker would intercept this transmission 127 of $E(K_h)(K_m)$, initiate its own session 132 with the receiver device 104. The intercepting device 128 poses as a transmitter in this new session.

The intercepting device 128 may receive 132 the receiver devices's public key Kpub-rx and uses to encrypt the intercepted encrypted master key $E_{Km,\,m}(K_m)$ and nonce m 136 for transmission 138 to the receiver device 104. The receiver device 104 then decrypts 140 $E_{Kpub-rx}(E_{Kh,\,m}(K_m), m)$ using its private key Kpriv-rx. The receiver device 104 then encrypts $E_{Km,\,m}(K_m)$ using its receiver secret key $K_h$ and nonce m as follows:

$$\begin{aligned}\text{Encrypt } E_{Kh,m}(E_{Kh,m}(K_m)) &= AES[K_h](m) \oplus (E_{Kh,m}(K_m))\\ &= AES[K_h](m) \oplus AES[K_h](m) \oplus K_m\\ &= K_m.\end{aligned}$$

The receiver device 104 the sends then back 144 $E(K_h)$ $(E(K_h)(K_m))$ which is just $K_m$. Consequently, the intercepting device 128 is able to obtain the master key $K_m$ due to the self-inverting nature of the encryption used by the receiver device 104. With the master key $K_m$, the intercepting device 128 may be able to decode encrypted content that the transmitter device 102 may send to the receiver device 104.

Therefore, an improved security measure is needed that prevent an intercepting device from exploiting the weaknesses of the encryption used by the receiver device.

SUMMARY

A method operational on a receiver device for exchanging and/or generating security keys is provided. The receiver device may include a receiver public key Kpub-rx and a receiver private key Kpri-rx, which may be a cryptographic key pair pre-stored at the receiver device. Additionally, the receiver device may also include a secret key Kh is pre-stored in the receiver device and is unknown to a transmitter device. The receiver public key Kpub-rx, the receiver private key Kpri-rx, and the secret key Kh may be generated and utilized only between power cycles of the receiver device or during a session.

The public key Kpub-rx may be sent/transmitted from the receiver device to the transmitter device. A first encrypted master key Km is received from a transmitter device, where the first encrypted master key Km secured by a receiver public key Kpub-rx. The first encrypted master key Km may then be decrypted with a receiver private key Kpri-rx to obtain the master key Km. The receiver device may store the master key Km in a volatile storage device only between power cycles of the receiver device or during a session. The master key Km is then encrypted by the receiver device using a block cipher that applies a receiver secret key Kh to obtain a second encrypted master key. The second encrypted master key is then sent to the transmitter device. At a subsequent time, the second encrypted master key may be received at the receiver device from the transmitter device as part of a process in which the transmitter device is to deliver protected content to the receiver device.

In one example, the block cipher may include a plurality of distinct round keys generated from the secret key Kh. For instance, the block cipher may be a Luby-Rackoff cipher implementing an unbreakable function in each round. The function may be one of an Advance Encryption Standard (AES)-128 function and a Secure Hash Algorithm (SHA)-256 function.

In one implementation, the master key Km may be used within a High-bandwidth Digital Content Protection (HDCP) encryption protocol for copy-protected video content.

A receiver device is also provided comprising a communication circuit, a non-volatile storage device, and a processing circuit. The communication circuit may serve to communicate with a transmitter device. The non-volatile storage device may serve to pre-store the secret key Kh, where the secret key Kh is unknown to the transmitter device.

The processing circuit adapted to: (a) send the public key Kpub-rx from the receiver device to the transmitter device; (b) receive a first encrypted master key Km from the transmitter device, the first encrypted master key Km secured by the receiver public key Kpub-rx; (c) decrypt the first encrypted master key Km with the receiver private key Kpri-rx to obtain the master key Km; (d) encrypt the master key Km using a block cipher that applies a receiver secret key Kh to obtain a second encrypted master key; (e) send the second encrypted master key to the transmitter device; and/or (f) receive the second encrypted master key from the transmitter device at a subsequent time as part of a process in which the transmitter device is to deliver protected content to the receiver device.

Another method operational on a receiver device is provided for exchanging and/or generating security keys. The receiver device may include a receiver public key Kpub-rx and a receiver private key Kpri-rx, which may be a cryptographic key pair pre-stored at the receiver device. Additionally, the receiver device may also include a secret key Kh is pre-stored in the receiver device and is unknown to a transmitter device. The receiver public key Kpub-rx, the receiver private key Kpri-rx, and the secret key Kh may be generated and utilized only between power cycles of the receiver device or during a session.

The receiver device may send the public key Kpub-rx to the transmitter device as well as a receiver nonce $r_{rx}$. The receiver device may receive a transmitter nonce $r_{tx}$ from the transmitter device. A first encrypted master key Km and a master nonce m may also be received from the transmitter device, wherein the first encrypted master key Km is secured by the receiver public key Kpub-rx, and the master nonce m is a function of both the transmitter nonce $t_{rx}$ and the receiver nonce $r_{rx}$. The receiver device may then decrypt the first encrypted master key Km with a receiver private key Kpri-rx to obtain the master key Km. The master key Km may be encrypted using a receiver secret key Kh and the master nonce m within an Advanced Encryption Standard (AES) block cipher to obtain a second encrypted master key. The second encrypted master key may be sent by the receiver device to the transmitter device.

Subsequently, a new instance of the transmitter nonce $r_{tx'}$ may be received as part of a new session. Additionally, the second encrypted master key may also be received along with the master nonce m. The receiver device may verify that the master nonce m is a function of the new instance of the transmitter nonce $r_{tx'}$ the receiver nonce $r_{rx}$ prior to proceeding with the new session.

If the master nonce m is not based on the receiver nonce $r_{rx}$, then the receiver device may terminate the new session.

The receiver may device may store the master key Km in a volatile storage device only between power cycles of the receiver device or during a session. The master key Km may be used within a High-bandwidth Digital Content Protection (HDCP) encryption protocol for copy-protected video content.

A receiver device is also provided comprising a communication circuit, a non-volatile storage device, and a processing circuit. The communication circuit may serve to communicate with a transmitter device. The non-volatile storage device may serve to pre-store the secret key Kh, where the secret key Kh is unknown to the transmitter device.

The processing circuit may be adapted to: (a) send the public key Kpub-rx from the receiver device to the transmitter device; (b) transmit a receiver nonce $r_{rx}$ to a transmitter device; (c) receive a transmitter nonce $r_{tx}$ from the transmitter device; (d) receive a first encrypted master key Km and a master nonce m from the transmitter device, wherein the first encrypted master key Km is secured by the receiver public key Kpub-rx, and the master nonce m is a function of both the transmitter nonce $t_{rx}$ and the receiver nonce $r_{rx}$; (e) decrypt the first encrypted master key Km with the receiver private key Kpri-rx to obtain the master key Km; (f) encrypt the master key Km using a receiver secret key Kh and the master nonce m within an Advanced Encryption Standard (AES) block cipher to obtain a second encrypted master key; (g) send the second encrypted master key to the transmitter device; (h) receive a new instance of the transmitter nonce $r_{tx'}$ as part of a new session; (i) receive the second encrypted master key along with the master nonce m; and/or (j) verify that the master nonce m is a function of the new instance of the transmitter nonce $r_{tx'}$ the receiver nonce $r_{rx}$ prior to proceeding with the new session.

BRIEF DESCRIPTION OF THE DRAWINGS

Various features, nature and advantages may become apparent from the detailed description set forth below when taken in conjunction with the drawings in which like reference characters identify correspondingly throughout.

DETAILED DESCRIPTION

Figure 1:
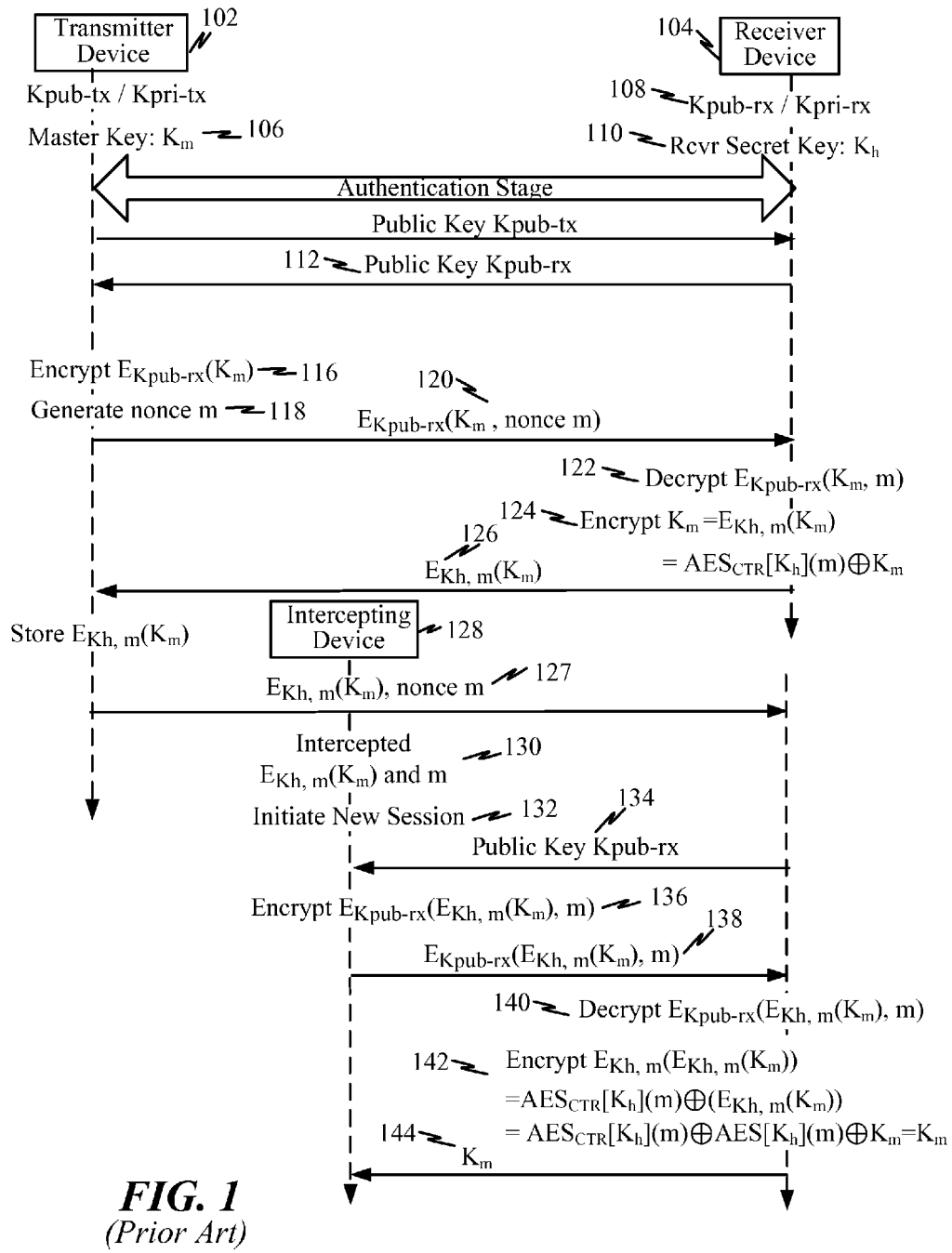
FIG. 1 illustrates an example of the authentication phase between a transmitter device and a receiver device.

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation.

Overview

One approach to overcome the security weaknesses discussed above is to change the encryption function used by the receiver device for sending the master key $K_m$ back to the transmitter device. However, this may be constrained by the limited processing capabilities of some receiver devices (e.g., receiver devices that do not include or have access to non-volatile storage/memory, thereby preventing the receiver from generating and storing keys).

Various exemplary methods are disclosed to improve security of authentication protocols in which cryptographic keys are derived between a transmitter device and a receiver device. In one example, such exemplary methods may be applicable to authentication protocol used by High-bandwidth Digital Content Protection (HDCP) for copy-protected video content distribution.

Generally, solutions are provided where a receiver device which implements an encryption algorithm that is not the inverse of its decryption algorithm. That is, by avoiding purely self-inverting encryption/decryption operations, the risk of exposing the master key $K_m$ is mitigated.

A first method implements an Advanced Encryption Standard (AES) algorithm for encrypting at the receiver device. Plain AES (instead of counter mode) is very fast, simple, and effective, but has the disadvantage of potentially requiring additional hardware at the receiver device.

A second method uses the primitives that are already required by the HDCP 2 specification and uses them in a block cipher (e.g., Luby-Rackoff construction cipher) to provide a cipher that is not the inverse of itself. This method is a bit slower (due to the block cipher) but requires no additional primitives to be implemented.

These first two methods keep interoperability with the HDCP 2 specification and require no change to transmitter devices.

A third method alters the way an initializing vector (IV) for the AES counter mode cipher is computed to encrypt a master key $K_m$. Hence this method may require changes to both the receiver and transmitter devices.

First Exemplary Solution

Figure 2:
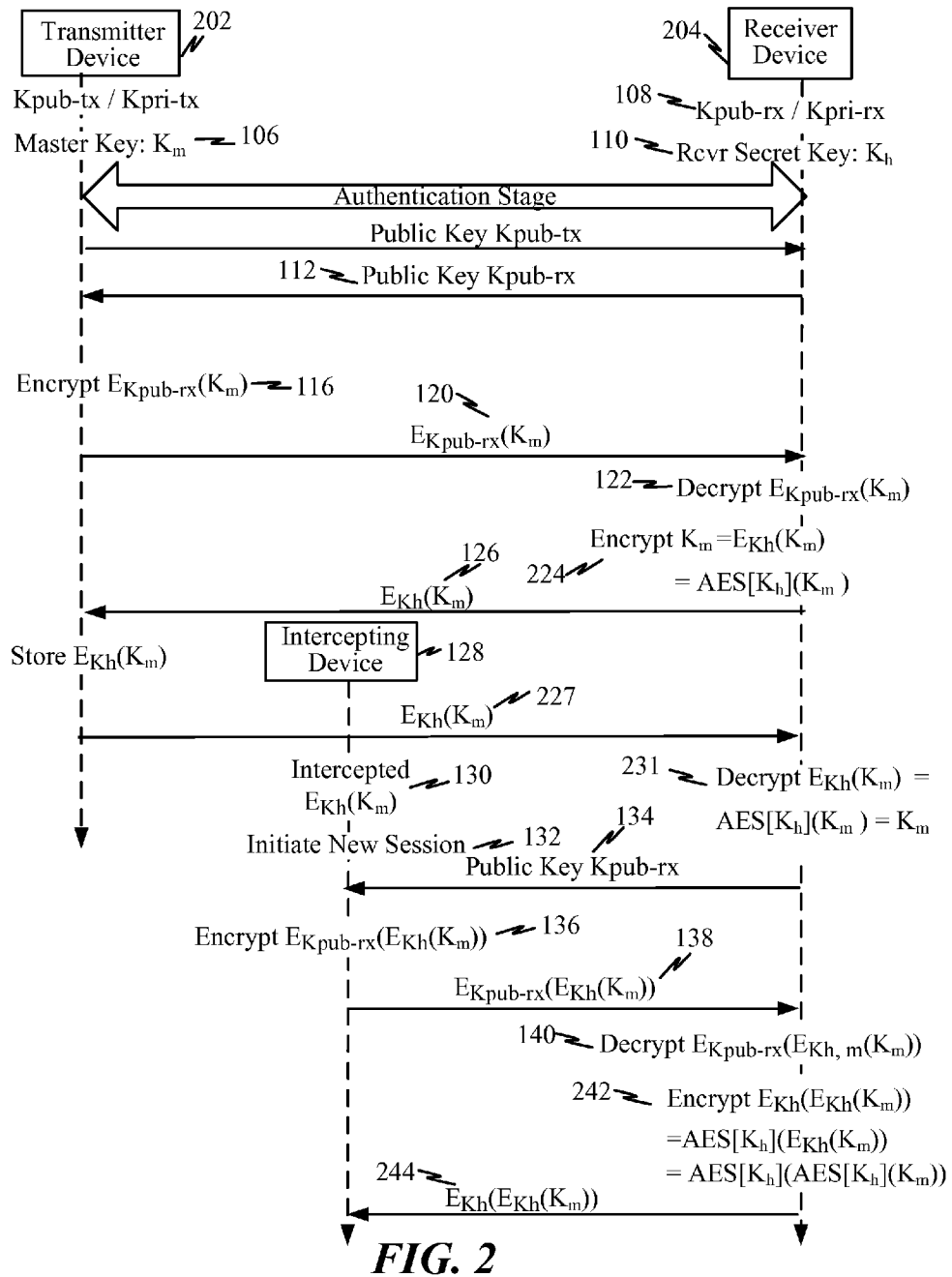
FIG. 2 illustrates a first approach in which encryption of a master key $K_m$ at a receiver device is done using an AES cipher rather than an AES cipher in counter mode.

FIG. 2 illustrates a first approach in which encryption of a master key $K_m$ at a receiver device is done using an AES cipher rather than an AES cipher in counter mode. An AES cipher may be a cipher based on a substitution-permutation network that transforms plaintext to ciphertext, and vice versa, over multiple rounds. An AES cipher in counter mode successively encrypts values of a "counter", where such counter can be any function which produces a sequence which is guaranteed not to repeat for a long time.

In the approach illustrated in FIG. 1, the receiver device 104 only uses AES encryption but not AES decryption since all decryptions by the receiver device 104 are done using the receiver's cryptographic keys (Kpub-rx, Kpri-rx). In one example, such receiver device may include an encryption device (e.g., to implement AES cipher in counter mode) but no decryption device. Thus, the receiver device's cryptographic keys (Kpub-rx, Kpri-rx) are used for decryption.

In the approach illustrated in FIG. 2, a receiver device 204 is provided with AES encryption and AES decryption capabilities which it may use to obtain a master key $K_m$ as part of a cryptographic key exchange with a transmitter device 202. In FIG. 2, instead of using a self-inverting XOR operation with the master key $K_m$, the master key $K_m$ is used within the AES, not just XORed. So, even if an intercepting device 128 intercepts the transmission 227 and tries to resend 138 the encrypted master key $K_m$ to the receiver device 204, the receiver device 204 no longer generates $K_m$ when it tries to encrypt 242 the encrypted master key $E_{Kh}(K_m)$. As illustrated here, in step 244 the intercepting device 128 no longer gets the master key $K_m$, but a doubly encrypted master key $E_{Kh}(E_{Kh}(K_m))$ which it cannot use to decode or access anything.

If receiver device includes programmable firmware, this solution does not need any additional hardware to implement both encryption (at step 224) and decryption (at step 231) using AES. Otherwise, the receiver device must include hardware to perform AES decryption which makes the die area of a semiconductor larger. Another drawback to this solution is that many receiver devices have limited computational capabilities, making implementation of AES decryption undesirable.

Second Exemplary Solution

Figure 3:
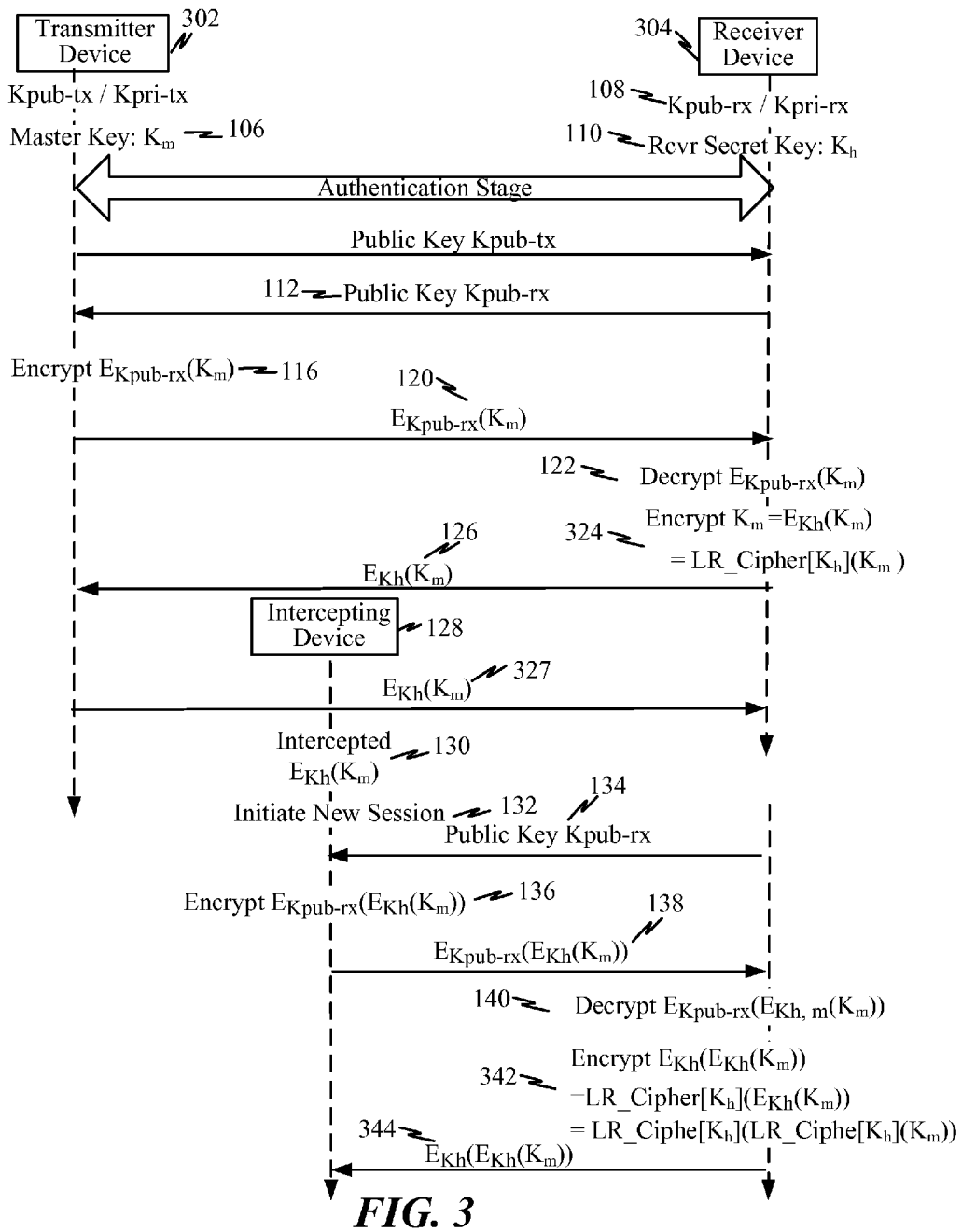
FIG. 3 illustrates a second approach in which encryption of a master key $K_m$ at a receiver device is done using a block cipher rather than an AES cipher in counter mode (which is considered a stream cipher).

FIG. 3 illustrates a second approach in which encryption of a master key $K_m$ at a receiver device is done using a block cipher rather than an AES cipher in counter mode (which is considered a stream cipher). Stream ciphers encrypt bits of information one at a time (i.e., operate on 1 bit of data at a time). A stream cipher may include a state machine that outputs one bit of information at each state transition. This stream of output bits is commonly called a running key. Block ciphers encrypt information by breaking it down into (fixed size) blocks (e.g., pluralities of bits) and encrypting data in each block. Block cipher encryption usually includes multiple rounds of bit shifts, XORs, permutations, and substitutions of plaintext and key bits. Stream ciphers are faster and smaller to implement than block ciphers, however, they have an important security gap. If the same key stream is used, certain types of attacks may cause the information to be revealed.

In this second approach, AES encryption is only used as the building block for a block cipher by which the receiver device can encrypt and decrypt in a non-inverting manner. In one example, the block cipher may be based on a Luby-Rackoff cipher (Feistel network/cipher) with 3 or 4 rounds.

Figure 4:
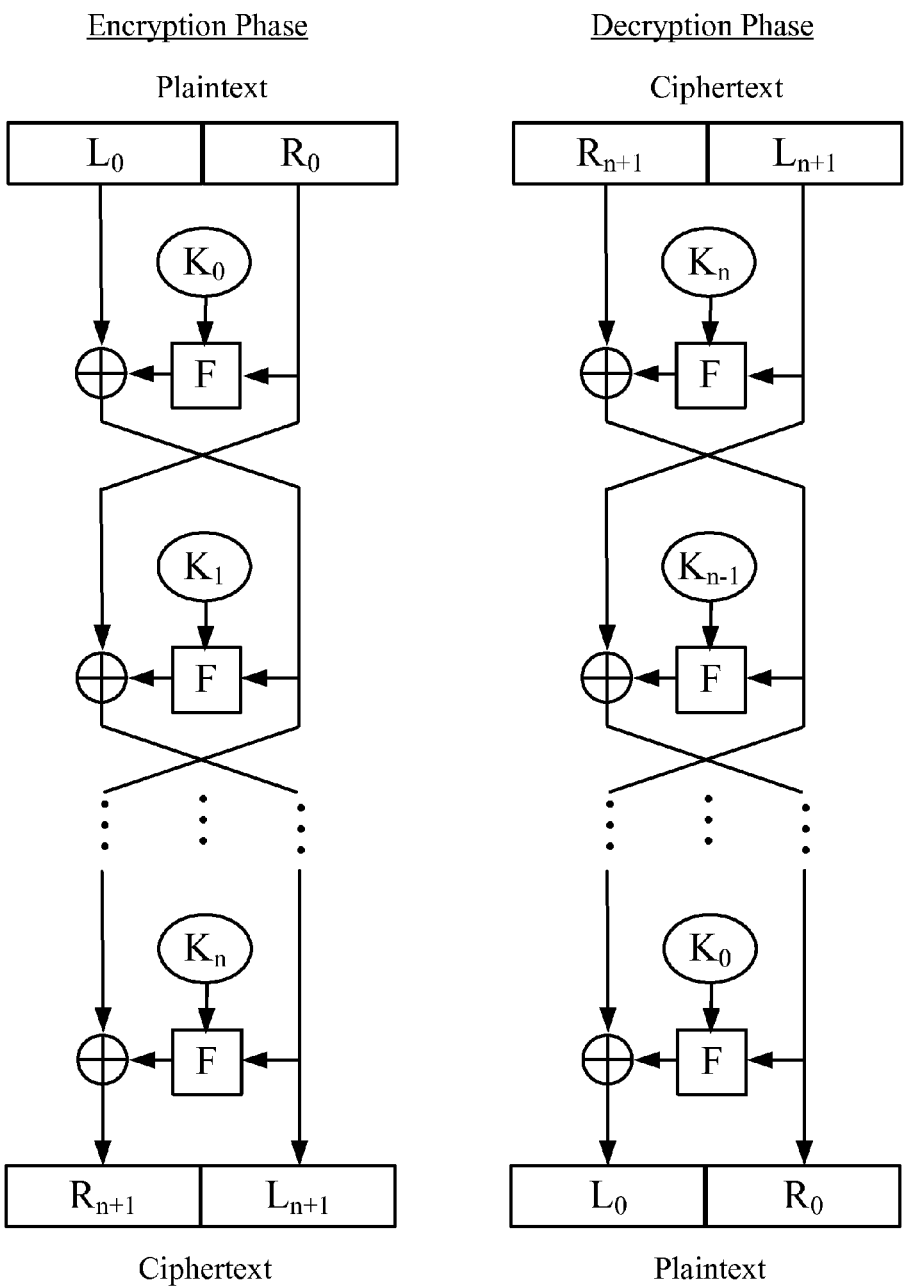
FIG. 4 is a block diagram illustrating an example of a Feistel cipher which is an example of a block cipher.

FIG. 4 is a block diagram illustrating an example of a Feistel cipher which is an example of a block cipher. As illustrated in FIG. 4, the right-side $R_{0\ldots n+1}$ of "plaintext" (e.g., master key $K_m$) is used as an input to a function F which output is then XORed with the left-side $L_{0\ldots n+1}$ of the "plaintext" (e.g., master key $K_m$) over multiple rounds. The left-side and right side are inverted or swapped on each round. The function F may be, for example, Advance Encryption Standard (AES)-128 or Secure Hash Algorithm (SHA)-256, with different round keys $k_0, k_1, \ldots k_n$ which may be chosen as different 64-bit sections of the receiver's secret key $K_h$. In a Luby-Rackoff cipher, it is assumed that the function F is unbreakable, so 3 or 4 rounds would be sufficient to secure the master key $K_m$.

Depending on the relative performance of AES-128 and SHA-256, it may be useful to define the round function of the Feistel network as the low 64-bits of SHA-256 of the input XORed or concatenated with the corresponding round key $k_0$, $k_1, \ldots k_n$ (padded with zeros).

Another variant combines different round functions in the Feistel network, using various combinations of AES with round keys and SHA-256 with the input pre-XORed with the corresponding round key.

In this manner, the encryption capabilities of the receiver device 304 is used to provide both encryption and decryption capabilities.

In FIG. 3, instead of using a self-inverting XOR operation with the master key $K_m$, the master key $K_m$ is used within a Luby-Rackoff cipher (LR_Cipher), not just XORed. So, even if an intercepting device 128 intercepts the transmission 327 and tries to resend 138 the encrypted master key $K_m$ to the receiver device 304, the receiver device 304 no longer generates $K_m$ when it tries to encrypt 342 the encrypted master key $E_{Kh}(K_m)$. As illustrated here, in step 344 the intercepting device no longer gets $K_m$, but a doubly encrypted key $E_{Kh}(E_{Kh}(K_m))$ (i.e., doubly encrypted using an Luby-Rackoff cipher) which it cannot use to decode or access anything. Note that in the first encryption operation, at step 324, the Luby-Rackoff cipher is applied over the master key $K_m$ while on the second encryption operation, at step 342, the Luby-Rackoff cipher is applied over the encrypted master key $E_{Kh}(K_m)$.

Figure 5:
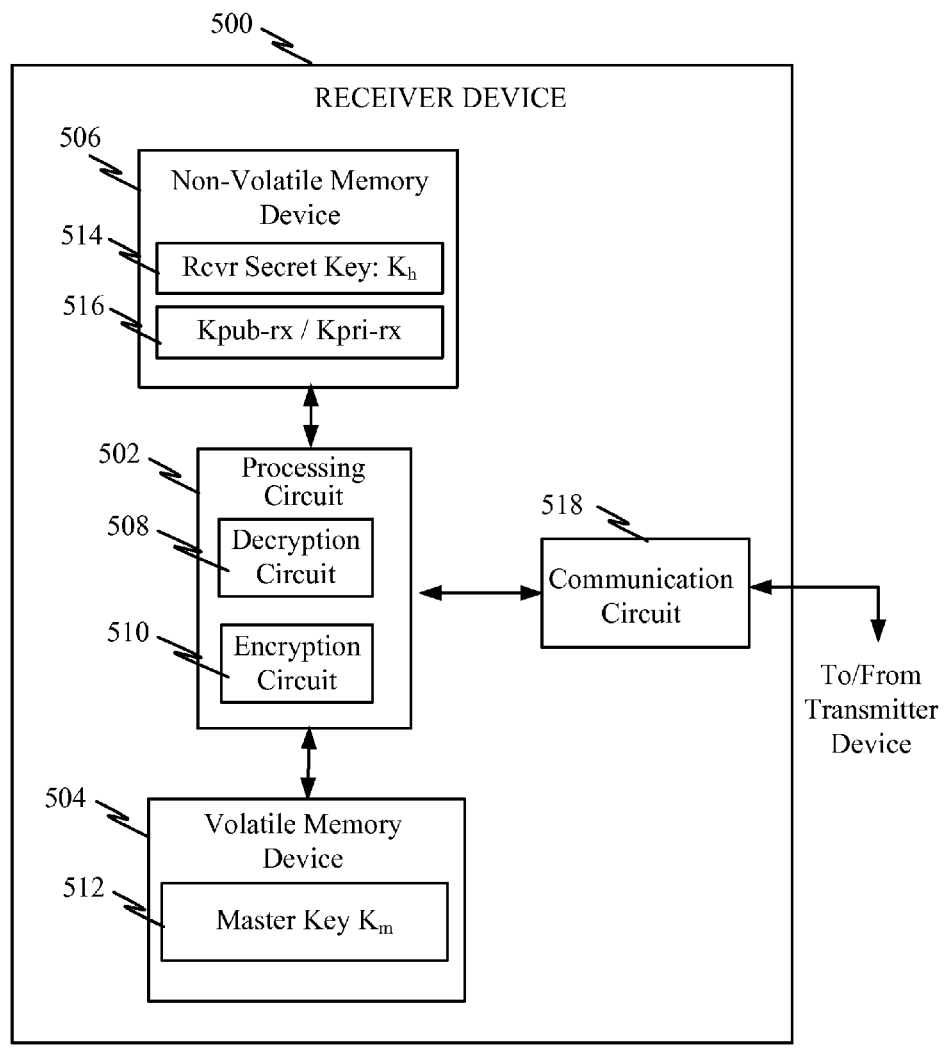
FIG. 5 is a block diagram illustrating a receiver device adapted to securely generate a master key according to the approach of FIG. 3.

FIG. 5 is a block diagram illustrating a receiver device adapted to securely generate a master key according to the approach of FIG. 3. The receiver device 500 may include a processing circuit 502 coupled to a communication circuit 518, a volatile memory device 504, and/or a non-volatile memory device 506. The communication circuit 518 may serve to communicate to and/or from a transmitter device.

The volatile memory device 504 may serve to store information generated during a session (or between power cycles), such as a master key $K_m$ 512, but cannot store information between power cycles.

The non-volatile memory device 506 may be, for example, flash memory which retains information between power cycles. In some implementations, the non-volatile memory device 506 may be read-only memory or may not be accessible for write/storage operations to the processing circuit 502. In some implementations, the non-volatile memory device 506 may store a receiver public/private cryptographic key pair 516 and/or a receiver secret key $K_h$ 514.

The processing circuit 502 may include an encryption circuit 510 and/or a decryption circuit 508. The encryption circuit 510 and/or a decryption circuit 508 may serve, for example, to perform an authentication exchange and/or a key exchange with a transmitter device. Such authentication and/or key may exchange may permit the receiver device to access encrypted content sent by the transmitter device (via the communication circuit 518).

In one example, the processing circuit may be adapted to send the public key Kpub-rx from the receiver device to the transmitter device (via the communication circuit 518). Note that the receiver public/private key pair 516 may be pre-generated/pre-stored within the non-volatile memory device 506. Alternatively, the processing circuit 502 may be adapted to dynamically generate such receiver public/private key pair 516. In response, the receiver device 508 may receive (via the communication circuit 518) a first encrypted master key Km from a transmitter device. As received, the first encrypted master key Km may be secured by the receiver public key Kpub-rx. The decryption circuit 508 may then decrypt the first encrypted master key Km with the receiver private key Kpri-rx to obtain the master key Km. The encryption circuit 510 may then encrypt the master key Km using a block cipher using a secret key Kh to obtain a second encrypted master key. The processing circuit may then send the second encrypted master key to the transmitter device (via the communication circuit 518).

At a subsequent time, the second encrypted master key may be received from the transmitter device as part of a process in which the transmitter device is to deliver protected content to the receiver device 500.

Figure 6:
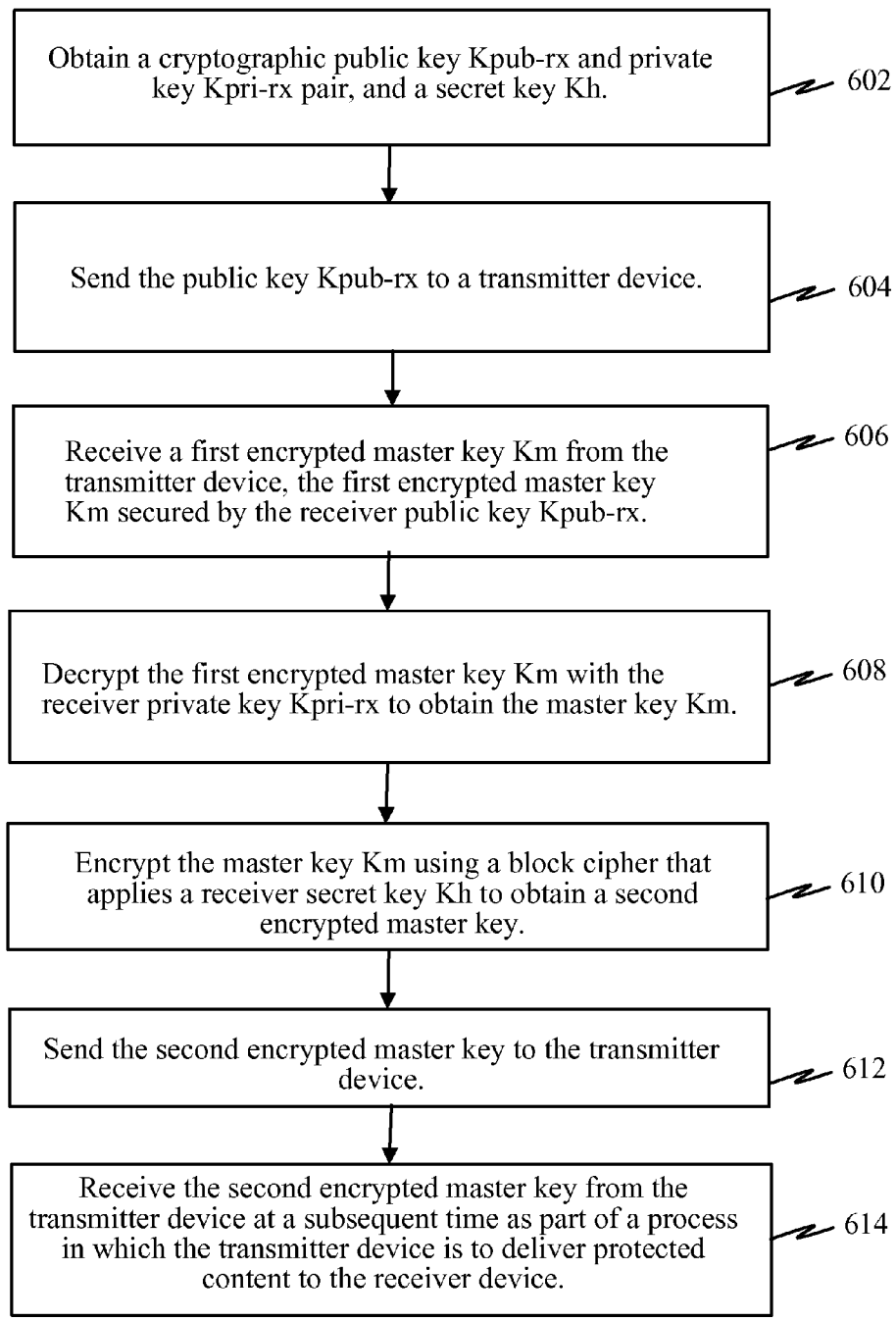
FIG. 6 illustrates a method operational in a receiver device to securely generate a master key according to the approach of FIG. 3.

FIG. 6 illustrates a method operational in a receiver device to securely generate a master key according to the approach of FIG. 3. This method may be implemented, for example, by one or more components of the receiver device 500 of FIG. 5 for exchanging and/or generating security keys.

The receiver device may obtain (e.g., from non-volatile memory) or dynamically generate a receiver public key Kpub-rx, a receiver private key Kpri-rx pair, and a secret key Kh 602. The receiver public key Kpub-rx and receiver private key Kpri-rx may be a cryptographic key pair pre-stored at the receiver device. The secret key Kh may be pre-stored in the receiver device and is unknown to the transmitter device. In one example, the receiver public key Kpub-rx, the receiver private key Kpri-rx, and the secret key Kh are generated and utilized only between power cycles of the receiver device or during a session.

The receiver device may send the public key Kpub-rx from the receiver device to the transmitter device 604. In response, the receiver device may receive a first encrypted master key Km from the transmitter device, the first encrypted master key Km secured by the receiver public key Kpub-rx 606. The receiver device may then decrypt the first encrypted master key Km with the receiver private key Kpri-rx to obtain the master key Km 608. The receiver device may then encrypt the master key Km using a block cipher that applies a receiver secret key Kh to obtain a second encrypted master key 610. The second encrypted master key may then be sent to the transmitter device 612. At a subsequent time, the receiver device may receive the second encrypted master key from the transmitter device as part of a process in which the transmitter device is to deliver protected content to the receiver device 614.

The receiver device may store the master key Km in a volatile storage device only between power cycles of the receiver device or during a session. In one example, the master key Km may be used within a High-bandwidth Digital Content Protection (HDCP) encryption protocol for copy-protected video content.

In one example, the block cipher may include a plurality of distinct round keys generated from the secret key Kh. For instance, the block cipher may be a Luby-Rackoff cipher implementing an unbreakable function in each round. The function may be one of an Advance Encryption Standard (AES)-128 function and a Secure Hash Algorithm (SHA)-256 function.

Third Exemplary Solution

Figure 7A:
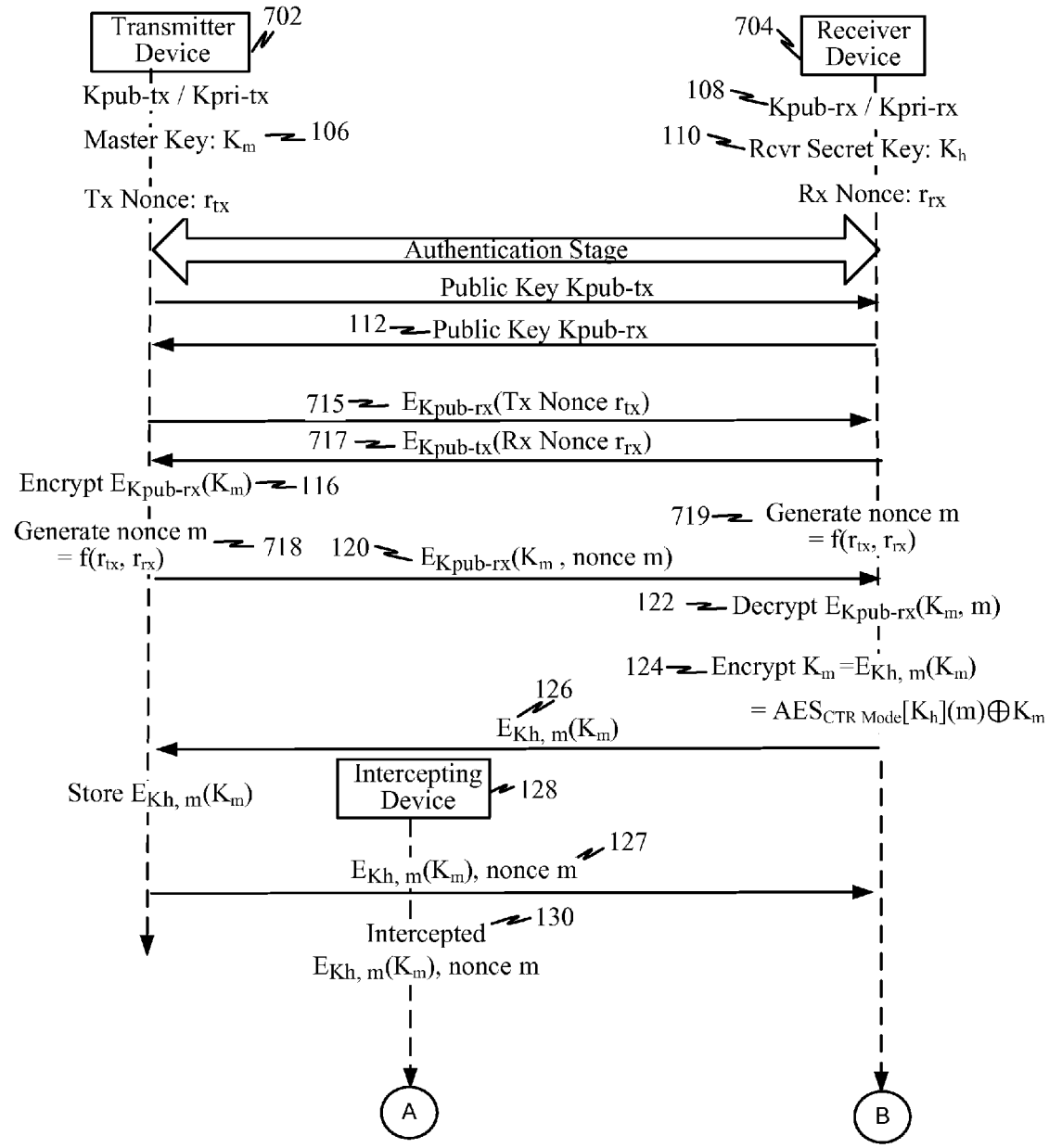
FIG. 7 (comprising FIGS. 7A and 7B) illustrates a third approach in which each of a transmitter device and receiver device are provisioned to transmit nonce $r_{tx}$ and receive nonce $r_{rx}$, respectively.
Figure 7B:
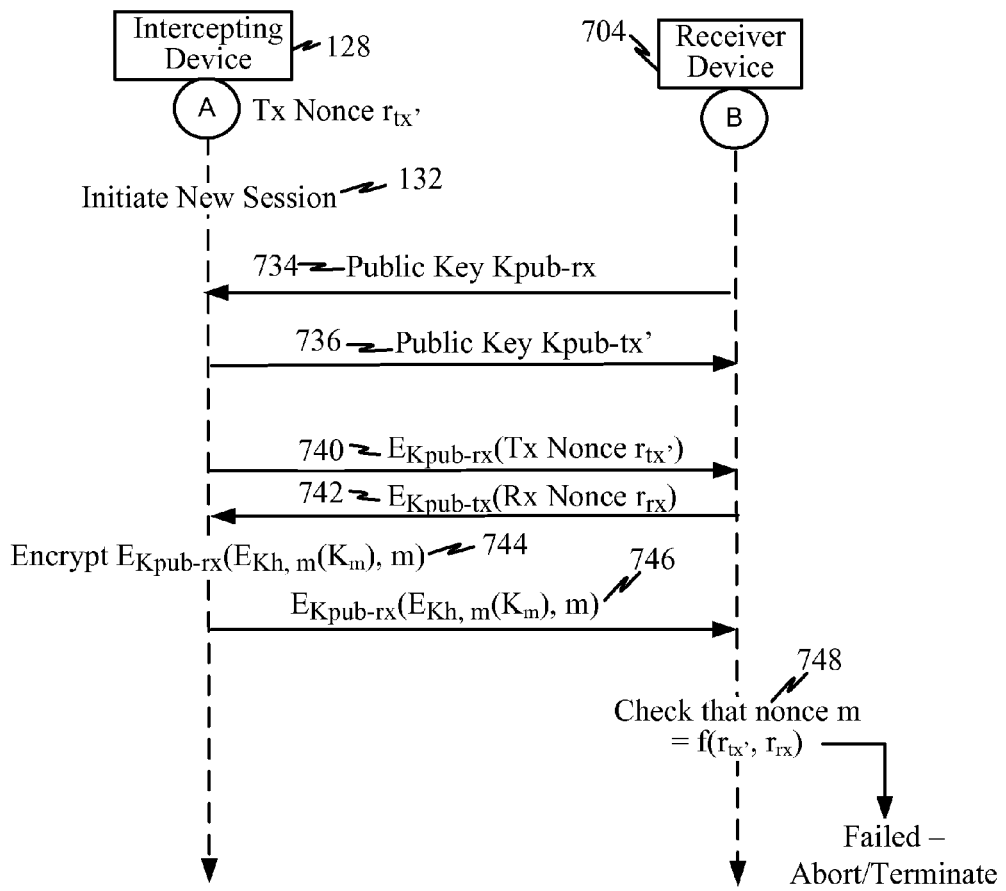

FIG. 7 (comprising FIGS. 7A and 7B) illustrates a third approach in which each of a transmitter device 702 and receiver device 704 are provisioned to transmit nonce $r_{tx}$ and receive nonce $r_{rx}$, respectively. The transmitter device 702 and receiver device 704 exchange their nonces $r_{tx}$ 715 and $r_{rx}$ 717. The master nonce m is then independently generated 718/719 by the transmitter device 702 and receiver device 704, respectively.

In this example, the master nonce m is a function of both $r_{tx}$ and $r_{rx}$. This allows the receiver device 704 to check whether a transmitter (e.g., transmitter device 702 or intercepting device 128) is sending the correct master nonce m during a handshake. For instance, in one example the master nonce $m=(r_{tx}\|r_{rx})$ padded with zeros. In another example, the master nonce m=concatenation of $r_{tx}$ and $r_{rx}$.

When the intercepting device 128 intercepts the encrypted master key $E_{Kh,\,m}(K_m)$ and master nonce m it may attempt to initiate a new session 132 in which it exchanges public keys 734 and 736 with the receiver device 704. The transmitter device 702 and receiver device 704 may also exchange nonces $r_{tx'}$ 740 and $r_{rx}$ 742. Note that the transmitter nonce $r_{tx'}$ for the intercepting device 128 is distinct from the transmitter nonce $r_{tx}$ for the transmitter device 702.

When the intercepting device 128 attempts to present the intercepted encrypted master key and nonce m (e.g., $E_{Kpub\text{-}rx}(E_{Kh,\,m}(K_m), m)$) to the receiver device 704, the receiver device 104 checks whether the received master nonce m is a function of nonces $r_{tx'}$ and $r_{rx}$. In this case, since the intercepting device's nonce $r_{tx'}$ is different from the transmitter's device nonce $r_{rx}$, the check 748 will fail. The receiver device 704 may then terminate or abort the handshake with the intercepting device 128, thereby preventing the intercepting device 128 from obtaining the master key $K_m$.

Figure 8:
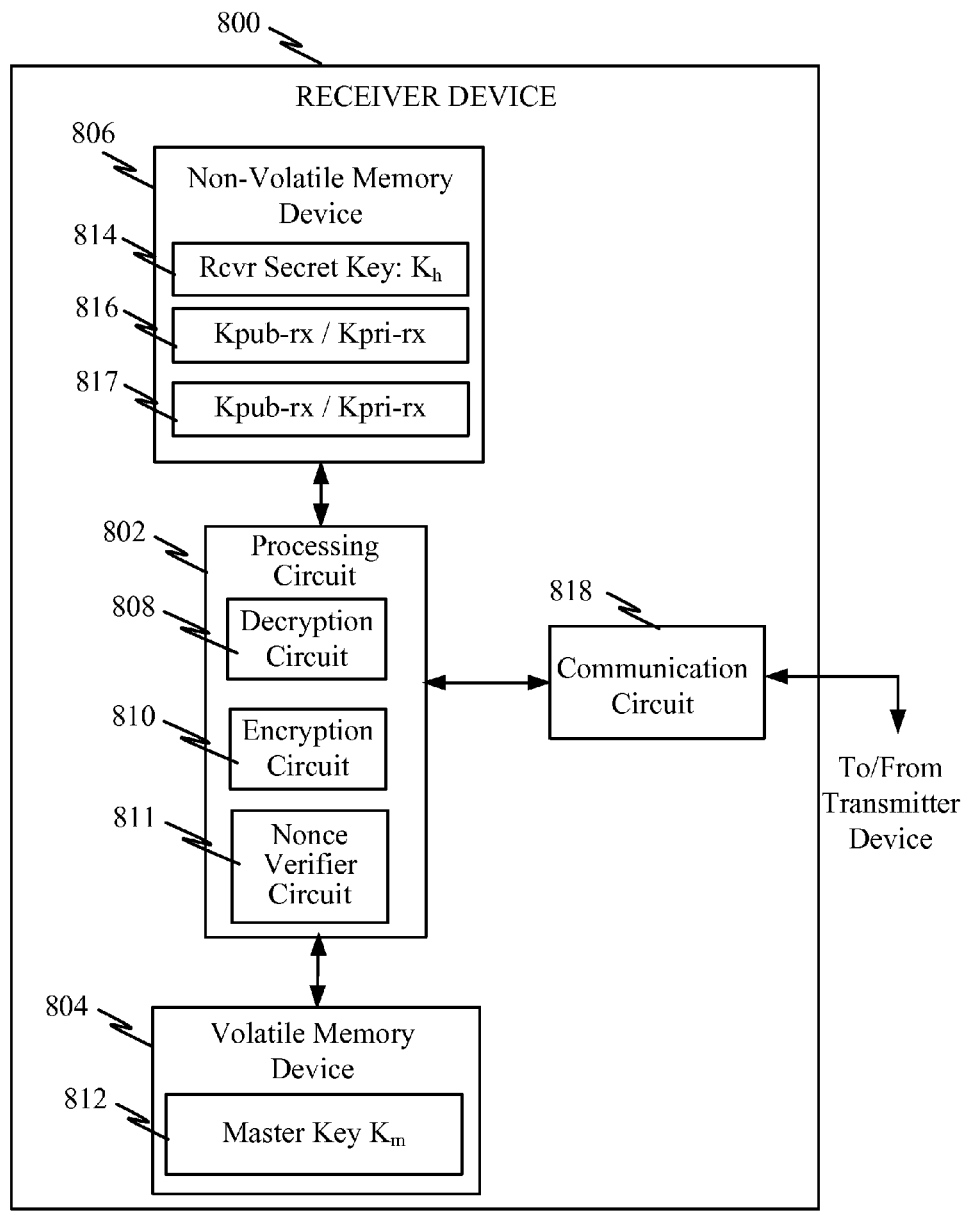
FIG. 8 is a block diagram illustrating a receiver device adapted to securely generate a master key according to the approach of FIG. 7.

FIG. 8 is a block diagram illustrating a receiver device adapted to securely generate a master key according to the approach of FIG. 7. The receiver device 800 may include a processing circuit 802 coupled to a communication circuit 818, a volatile memory device 804, and/or a non-volatile memory device 806. The communication circuit 818 may serve to communicate to and/or from a transmitter device.

The volatile memory device 804 may serve to store information generated during a session (or between power cycles), such as a master key $K_m$ 812, but cannot store information between power cycles.

The non-volatile memory device 806 may be, for example, flash memory which retains information between power cycles. In some implementations, the non-volatile memory device 806 may be read-only memory or may not be accessible for write/storage operations to the processing circuit 802. In some implementations, the non-volatile memory device 806 may store a receiver public/private cryptographic key pair 816, a receiver secret key $K_h$ 814, and/or a receiver nonce $r_{rx}$ 817.

The processing circuit 802 may include an encryption circuit 810 and/or a decryption circuit 808. The encryption circuit 810 and/or a decryption circuit 808 may serve, for example, to perform an authentication exchange and/or a key exchange with a transmitter device. Such authentication and/or key may exchange may permit the receiver device to access encrypted content sent by the transmitter device (via the communication circuit 818).

In one example, the processing circuit may be adapted to send/transmit (via the communication circuit 818) a receiver nonce $r_{rx}$ to a transmitter device. In return, the processing circuit may receive (via the communication circuit 818) a transmitter nonce $r_{tx}$ from the transmitter device. Additionally, the receiver device may also receive (via the communication circuit 818) a first encrypted master key Km and a master nonce m from the transmitter device, wherein the first encrypted master key Km is secured by a receiver public key Kpub-rx, and the master nonce m is a function of both the transmitter nonce $t_{rx}$ and the receiver nonce $r_{rx}$.

The decryption circuit 808 may then decrypt the first encrypted master key Km with a receiver private key Kpri-rx to obtain the master key Km. The encryption circuit 810 may encrypt the master key Km using a receiver secret key Kh and the master nonce m within an Advanced Encryption Standard (AES) block cipher to obtain a second encrypted master key. The second encrypted master key is then sent/transmitted to the transmitter device (via the communication circuit 818).

Subsequently, the receiver device may receive a new instance of the transmitter nonce $r_{tx'}$ as part of a new session. Additionally, the receiver device may also receive the second encrypted master key along with the master nonce m. A nonce verifier circuit 811 may then verify that the master nonce m is a function of the new instance of the transmitter nonce $r_{tx'}$ the receiver nonce $r_{rx}$ prior to proceeding with the new session.

Figure 9:
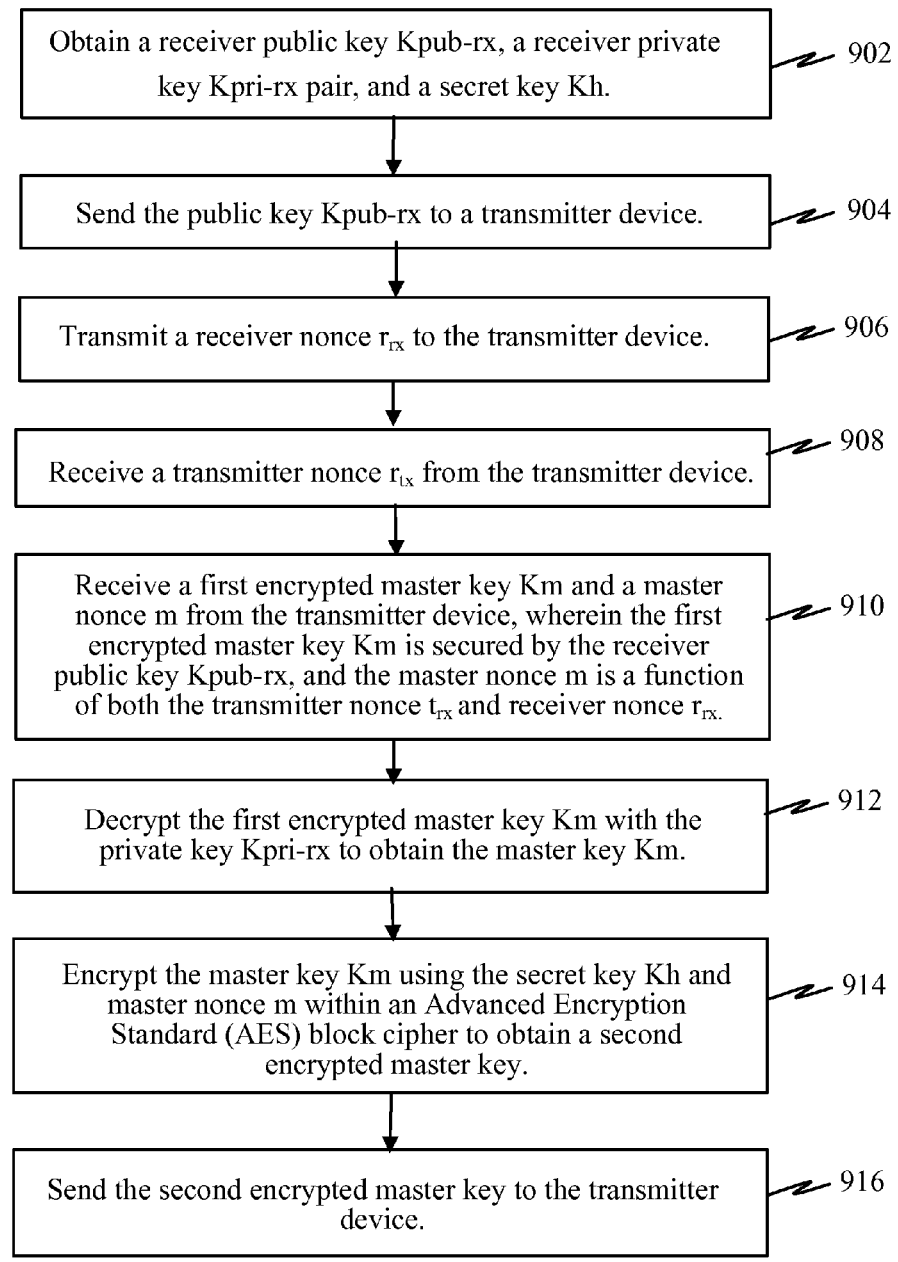
FIG. 9 illustrates a method operational in a receiver device to securely generate a master key according to the approach of FIG. 7.

FIG. 9 illustrates a method operational in a receiver device to securely exchange and/or generate a master key according to the approach of FIG. 7. The receiver device may obtain or generate a receiver public key Kpub-rx, a receiver private key Kpri-rx, and a secret key Kh 902. The receiver public key Kpub-rx and receiver private key Kpri-rx may be a cryptographic key pair pre-stored at the receiver device. The secret key Kh may be pre-stored in the receiver device and is unknown to the transmitter device. The receiver public key Kpub-rx, the private key Kpri-rx, and the secret key Kh may be generated and utilized only between power cycles of the receiver device or during a session.

The receiver device may send the public key Kpub-rx from the receiver device to a transmitter device 904. The receiver device may also send/transmit a receiver nonce $r_{rx}$ to the transmitter device 906. In response, the receiver device may receive a transmitter nonce $r_{tx}$ from the transmitter device 908. Additionally, the receiver device may receive a first encrypted master key Km and a master nonce m from the transmitter device, wherein the first encrypted master key Km is secured by a receiver public key Kpub-rx, and the master nonce m is a function of both the transmitter nonce $t_{rx}$ and the receiver nonce $r_{rx}$ 910. The first encrypted master key Km may be decrypted with a receiver private key Kpri-rx to obtain the master key Km 912. The master key Km may then be encrypted by the receiver device using a receiver secret key Kh and the master nonce m within an Advanced Encryption Standard (AES) block cipher to obtain a second encrypted master key 914. The receiver device may then send the second encrypted master key to the transmitter device 916.

Subsequently, the receiver device may receive a new instance of the transmitter nonce $r_{tx'}$ as part of a new session. The receiver device may also receive the second encrypted master key along with the master nonce m. The receiver device may then verify that the master nonce m is a function of the new instance of the transmitter nonce $r_{tx}$, the receiver nonce $r_{rx}$ prior to proceeding with the new session. The new session is terminated if the master nonce m is not based on the receiver nonce $r_{rx}$.

The receiver public key Kpub-rx, the receiver private key Kpri-rx, and the secret key Kh may be generated and utilized only between power cycles of the receiver device. The receiver device may store the master key Km in a volatile storage device only between power cycles of the receiver device or during a session. In one example, the master key Km may be used within a High-bandwidth Digital Content Protection (HDCP) encryption protocol for copy-protected video content.

One or more of the components, steps, features, and/or functions illustrated in the Figures may be rearranged and/or combined into a single component, step, feature or function or embodied in several components, steps, or functions. Additional elements, components, steps, and/or functions may also be added without departing from the invention. The apparatus, devices, and/or components illustrated in the Figures may be configured to perform one or more of the methods, features, or steps described in the Figures. The algorithms described herein may also be efficiently implemented in software and/or embedded in hardware.

Moreover, in one aspect of the disclosure, the processing circuit 502 and/or 802 illustrated in FIGS. 5 and 8 may be a specialized processor (e.g., an application specific integrated circuit (e.g., ASIC)) that is specifically designed and/or hard-wired to perform the algorithms, methods, and/or steps described in FIGS. 2, 3, 4, 6, 7, and/or 9. Thus, such a specialized processor (e.g., ASIC) may be one example of a means for executing the algorithms, methods, and/or steps described in FIGS. 2, 3, 4, 6, 7, and/or 9. The processor-readable storage medium may store instructions that when executed by a specialized processor (e.g., ASIC) causes the specialized processor to perform the algorithms, methods, and/or steps described herein.

Also, it is noted that the aspects of the present disclosure may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, aspects of the disclosure may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method operational on a receiver device for exchanging and/or generating security keys, comprising:
   receiving a first encrypted master key Km from a transmitter device, the first encrypted master key Km secured by a receiver public key Kpub-rx;
   decrypting the first encrypted master key Km with a receiver private key Kpri-rx to obtain the master key Km; and
   encrypting the master key Km using a block cipher that applies a receiver secret key Kh in a non-self-inverting operation to obtain a second encrypted master key.

2. The method of claim 1, wherein the non-self-inverting operation includes an encryption operation that is not an inverse of a corresponding decryption operation.

3. The method of claim 1, wherein the secret key Kh is pre-stored in the receiver device and is unknown to the transmitter device.

4. The method of claim 1, wherein the receiver public key Kpub-rx, the receiver private key Kpri-rx, and the secret key Kh are generated and utilized only between power cycles of the receiver device or during a session.

5. The method of claim 1, further comprising:
   sending the public key Kpub-rx from the receiver device to the transmitter device; and
   sending the second encrypted master key to the transmitter device.

6. The method of claim 5, further comprising:
   receiving the second encrypted master key from the transmitter device at a subsequent time as part of a process in which the transmitter device is to deliver protected content to the receiver device.

7. The method of claim 1, wherein the receiver device stores the master key Km in a volatile storage device only between power cycles of the receiver device or during a session.

8. The method of claim 1, wherein the block cipher includes a plurality of distinct round keys generated from the secret key Kh.

9. The method of claim 1, wherein the block cipher is a Luby-Rackoff cipher implementing an unbreakable function in each round.

10. The method of claim 9, wherein the function is one of an Advance Encryption Standard (AES)-128 function and a Secure Hash Algorithm (SHA)-256 function.

11. The method of claim 1, wherein the master key Km is used within a High-bandwidth Digital Content Protection (HDCP) encryption protocol for copy-protected video content.

12. A receiver device, comprising:
   a communication circuit for communicating with a transmitter device; and
   a processing circuit coupled to the communication circuit, the processing circuit adapted to:
      receive a first encrypted master key Km from the transmitter device, the first encrypted master key Km secured by a receiver public key Kpub-rx;
      decrypt the first encrypted master key Km with a receiver private key Kpri-rx to obtain the master key Km; and
      encrypt the master key Km using a block cipher that applies a receiver secret key Kh in a non-self-inverting operation to obtain a second encrypted master key.

13. The receiver device of claim 12, further comprising:
   a non-volatile storage device for pre-storing the secret key Kh, where the secret key Kh is unknown to the transmitter device.

14. The receiver device of claim 12, wherein the processing circuit is further adapted to:
   send the public key Kpub-rx from the receiver device to the transmitter device; and
   send the second encrypted master key to the transmitter device.

15. The receiver device of claim 14, wherein the processing circuit is further adapted to:
   receive the second encrypted master key from the transmitter device at a subsequent time as part of a process in which the transmitter device is to deliver protected content to the receiver device.

16. The receiver device of claim 12, wherein the block cipher includes a plurality of distinct round keys generated from the secret key Kh.

17. The receiver device of claim 12, wherein the block cipher is a Luby-Rackoff cipher implementing an unbreakable function in each round.

18. The receiver device of claim 12, wherein the master key Km is used within a High-bandwidth Digital Content Protection (HDCP) encryption protocol for copy-protected video content.

19. A receiver device, comprising
   means for receiving a first encrypted master key Km from a transmitter device, the first encrypted master key Km secured by a receiver public key Kpub-rx;
   means for decrypting the first encrypted master key Km with a receiver private key Kpri-rx to obtain the master key Km; and
   means for encrypting the master key Km using a block cipher that applies a receiver secret key Kh in a non-self-inverting operation to obtain a second encrypted master key.

20. The receiver device of claim 19, further comprising:
   means for sending the public key Kpub-rx from the receiver device to the transmitter device; and
   means for sending the second encrypted master key to the transmitter device.

21. The receiver device of claim 20, further comprising:
   means for receiving the second encrypted master key from the transmitter device at a subsequent time as part of a process in which the transmitter device is to deliver protected content to the receiver device.

22. A non-transitory machine-readable storage medium having instructions stored thereon which when executed by at least one processor causes the at least one processor to:
   receive a first encrypted master key Km from a transmitter device, the first encrypted master key Km secured by a receiver public key Kpub-rx;
   decrypt the first encrypted master key Km with a receiver private key Kpri-rx to obtain the master key Km; and
   encrypt the master key Km using a block cipher that applies a receiver secret key Kh in a non-self-inverting operation to obtain a second encrypted master key.

23. The machine-readable storage medium of claim 22 further having instructions stored thereon which when executed by at least one processor causes the at least one processor to:
   send the second encrypted master key to the transmitter device; and receive the second encrypted master key from the transmitter device at a subsequent time as part of a process in which the transmitter device is to deliver protected content to the receiver device.

24. A method operational on a receiver device for exchanging and/or generating security keys, comprising:
   transmitting a receiver nonce $r_{rx}$ to a transmitter device;
   receiving a transmitter nonce $r_{tx}$ from the transmitter device;
   receiving a first encrypted master key Km and a master nonce m from the transmitter device, wherein the first encrypted master key Km is secured by a receiver public key Kpub-rx, and the master nonce m is a function of both the transmitter nonce $r_{tx}$ and the receiver nonce $r_{rx}$;
   decrypting the first encrypted master key Km with a receiver private key Kpri-rx to obtain the master key Km; and
   encrypting the master key Km in a non-self-inverting operation using a receiver secret key Kh and the master nonce m within an Advanced Encryption Standard (AES) block cipher to obtain a second encrypted master key.

25. The method of claim 24, wherein the receiver public key Kpub-rx and receiver private key Kpri-rx are a cryptographic key pair pre-stored at the receiver device.

26. The method of claim 24, wherein the secret key Kh is pre-stored in the receiver device and is unknown to the transmitter device.

27. The method of claim 24, wherein the receiver public key Kpub-rx, receiver private key Kpri-rx pair, and the secret key Kh are generated and utilized only between power cycles of the receiver device or during a session.

28. The method of claim 24, further comprising:
   sending the public key Kpub-rx from the receiver device to the transmitter device; and
   sending the second encrypted master key to the transmitter device.

29. The method of claim 28, further comprising:
   receiving a new instance of the transmitter nonce $r_{tx'}$ as part of a new session;
   receiving the second encrypted master key along with the master nonce m; and
   verifying that the master nonce m is a function of the new instance of the transmitter nonce $r_{tx'}$ the receiver nonce $r_{rx}$ prior to proceeding with the new session.

30. The method of claim 29, further comprising:
   terminating the new session if the master nonce m is not based on the receiver nonce $r_{rx}$.

31. The method of claim 24, wherein the receiver device stores the master key Km in a volatile storage device only between power cycles of the receiver device or during a session.

32. The method of claim 24, wherein the master key Km is used within a High-bandwidth Digital Content Protection (HDCP) encryption protocol for copy-protected video content.

33. A receiver device, comprising:
   a communication circuit for communicating with a transmitter device; and
   a processing circuit coupled to the communication circuit, the processing circuit adapted to:
      transmit a receiver nonce $r_{rx}$ to a transmitter device;
      receive a transmitter nonce $r_{tx}$ from the transmitter device;
      receive a first encrypted master key Km and a master nonce m from the transmitter device, wherein the first encrypted master key Km is secured by a receiver public key Kpub-rx, and the master nonce m is a function of both the transmitter nonce rtx and the receiver nonce $r_{rx}$;
      decrypt the first encrypted master key Km with a receiver private key Kpri-rx to obtain the master key Km; and
      encrypt the master key Km in a non-self-inverting operation using a receiver secret key Kh and the master nonce m within an Advanced Encryption Standard (AES) block cipher to obtain a second encrypted master key.

34. The receiver device of claim 33, wherein the secret key Kh is pre-stored in the receiver device and is unknown to the transmitter device.

35. The receiver device of claim 33, wherein the processing circuit is further adapted to:
   send the public key Kpub-rx from the receiver device to the transmitter device; and
   send the second encrypted master key to the transmitter device.

36. The receiver device of claim 33, wherein the processing circuit is further adapted to:
   receive a new instance of the transmitter nonce $r_{tx'}$ as part of a new session;
   receive the second encrypted master key along with the master nonce m; and
   verify that the master nonce m is a function of the new instance of the transmitter nonce $r_{tx'}$ the receiver nonce $r_{rx}$ prior to proceeding with the new session.

37. A receiver device, comprising:
   means for transmitting a receiver nonce $r_{rx}$ to a transmitter device;
   means for receiving a transmitter nonce $r_{tx}$ from the transmitter device;
   means for receiving a first encrypted master key Km and a master nonce m from the transmitter device, wherein the first encrypted master key Km is secured by a receiver public key Kpub-rx, and the master nonce m is a function of both the transmitter nonce rtx and the receiver nonce rrx;
   means for decrypting the first encrypted master key Km with a receiver private key Kpri-rx to obtain the master key Km; and
   means for encrypting the master key Km in a non-self-inverting operation using a receiver secret key Kh and the master nonce m within an Advanced Encryption Standard (AES) block cipher to obtain a second encrypted master key.

38. The method of claim 37, further comprising:
   means for sending the second encrypted master key to the transmitter device;
   means for receiving a new instance of the transmitter nonce $r_{tx'}$ as part of a new session;
   means for receiving the second encrypted master key along with the master nonce m; and
   means for verifying that the master nonce m is a function of the new instance of the transmitter nonce $r_{tx'}$ the receiver nonce $r_{rx}$ prior to proceeding with the new session.

39. A non-transitory machine-readable storage medium having instructions stored thereon which when executed by at least one processor causes the at least one processor to:
   transmit a receiver nonce $r_{rx}$ to a transmitter device;
   receive a transmitter nonce $r_{tx}$ from the transmitter device;
   receive a first encrypted master key Km and a master nonce m from the transmitter device, wherein the first encrypted master key Km is secured by a receiver public key Kpub-rx, and the master nonce m is a function of both the transmitter nonce rtx and the receiver nonce rrx;
decrypt the first encrypted master key Km with a receiver private key Kpri-rx to obtain the master key Km; and
encrypt the master key Km in a non-self-inverting operation using a receiver secret key Kh and the master nonce m within an Advanced Encryption Standard (AES) block cipher to obtain a second encrypted master key.

* * * * *